(12) United States Patent
Davies et al.

(10) Patent No.: US 11,971,271 B2
(45) Date of Patent: Apr. 30, 2024

(54) TRAVEL TOOL FOR INDIVIDUALS WITH COGNITIVE DISABILITIES

(71) Applicant: ABLELINK SMART LIVING TECHNOLOGIES LLC, Colorado Springs, CO (US)

(72) Inventors: Daniel K. Davies, Colorado Springs, CO (US); Steven E. Stock, Colorado Springs, CO (US); Erik J. Mugele, Colorado Springs, CO (US); Cameron D. Davies, Colorado Springs, CO (US)

(73) Assignee: ABLELINK SMART LIVING TECHNOLOGIES, Colorado Springs, CO (US)

( * ) Notice: Subject to any disclaimer, the term of this patent is extended or adjusted under 35 U.S.C. 154(b) by 101 days.

(21) Appl. No.: 17/647,501

(22) Filed: Jan. 10, 2022

(65) Prior Publication Data
US 2022/0236066 A1 Jul. 28, 2022

Related U.S. Application Data

(60) Provisional application No. 63/141,817, filed on Jan. 26, 2021.

(51) Int. Cl.
*G01C 21/34* (2006.01)
*G01C 21/36* (2006.01)
*G06F 16/29* (2019.01)
*H04W 4/02* (2018.01)

(52) U.S. Cl.
CPC ..... *G01C 21/3484* (2013.01); *G01C 21/3655* (2013.01); *G06F 16/29* (2019.01); *H04W 4/025* (2013.01)

(58) Field of Classification Search
CPC . G01C 21/3484; G01C 21/3655; G06F 16/29; H04W 4/025
USPC ........................................................ 701/428
See application file for complete search history.

(56) References Cited

U.S. PATENT DOCUMENTS

2019/0049968 A1\* 2/2019 Dean ..................... A61G 5/04
2019/0261153 A1\* 8/2019 Avitan ................... G16H 40/67

\* cited by examiner

*Primary Examiner* — Yazan A Soofi
(74) *Attorney, Agent, or Firm* — Martensen IP; Michael C. Martensen

(57) ABSTRACT

Utilizing existing information of community transportation offerings, the present invention builds customized travel routes to enable independent mobility for individuals with cognitive disabilities. Visual, aural, and sensory prompts are provided based on the location of, and through, a mobile device. Concurrently with providing direction and reassurance to the traveler, the system monitors the location and progress of the traveler along the route. Upon recognition that the mobile device (traveler) is no longer on the initiated route, a caregiver, or the like, is notified to render assistance.

20 Claims, 13 Drawing Sheets

TRAVEL TOOL FOR INDIVIDUALS WITH COGNITIVE DISABILITIES

RELATED APPLICATION

The present application relates to and claims the benefit of priority to U.S. Provisional Patent Application No. 63/141,817 filed 26 Jan. 2021 which is hereby incorporated by reference in its entirety for all purposes as if fully set forth herein.

BACKGROUND OF THE INVENTION

Field of the Invention

Embodiments of the present invention relate, in general, to a tool for assisting individuals with cognitive disabilities and more particularly to a travel tool for assisting people with cognitive disabilities travel from a point of origin to a target destination.

Relevant Background

Individuals with cognitive disabilities face numerous challenges when engaging in what would otherwise be considered normal day to day activities. One such activity is independently traveling from a point of origin to a target destination.

Mass transit functions to efficiently move individuals from one point to another along a designated route. Simple tasks such as understanding where and when to pick up a bus, how to pay for the fare, and when to exit the vehicle can be overwhelming to an individual with cognitive disabilities.

Mainstream GPS based navigation systems are generally overly complex for most individuals with cognitive disabilities to understand, use and benefit. Most individuals with cognitive disabilities are dependent on agency or family support for transportation, or on the use of paratransit services. Further, these types of transportation services require dependence on others and are not integrated with use by the general population. Paratransit, for example, is required by the American with Disabilities Act and other laws and although costs vary, are generally nine times or more expensive than providing a similar travel trip via fixed route (public) services.

Field implementation and research has shown that caregivers and families of many individuals with cognitive disabilities are extremely hesitant to provide opportunities to use public transportation due to fears of loved ones getting lost or being taken advantage. What is needed is a system that offers tracking, communication and other safety features while breaking down attitudinal barriers and therefore initiate opportunities for increased use of and independence in public transit services, along with the significant opportunities for improved community participation and quality of life for individuals with a cognitive disability. A system and associated methodology by which an individual with cognitive disabilities can independently navigate from a point of origin to a target destination along a fixed route is lacking in the prior art and is needed. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A travel system allows individuals with cognitive disabilities to independently navigate fixed route transportation services or walking routes. An application executable by a mobile computing device provides multimodal (audible, visual, tactile) location-based prompts to navigate along a predetermined route. In one embodiment of the present invention a route created by using a map interface and supplemented with General Transit Feed Specification (GTFS) data is linked to a location identification device such as the Global Positioning System (GPS) or the like. Upon initiation, the system provides user with location-based behavioral prompts configured to present instructional information via a user interface of a mobile device in a format suitable for an individual with a cognitive disability.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
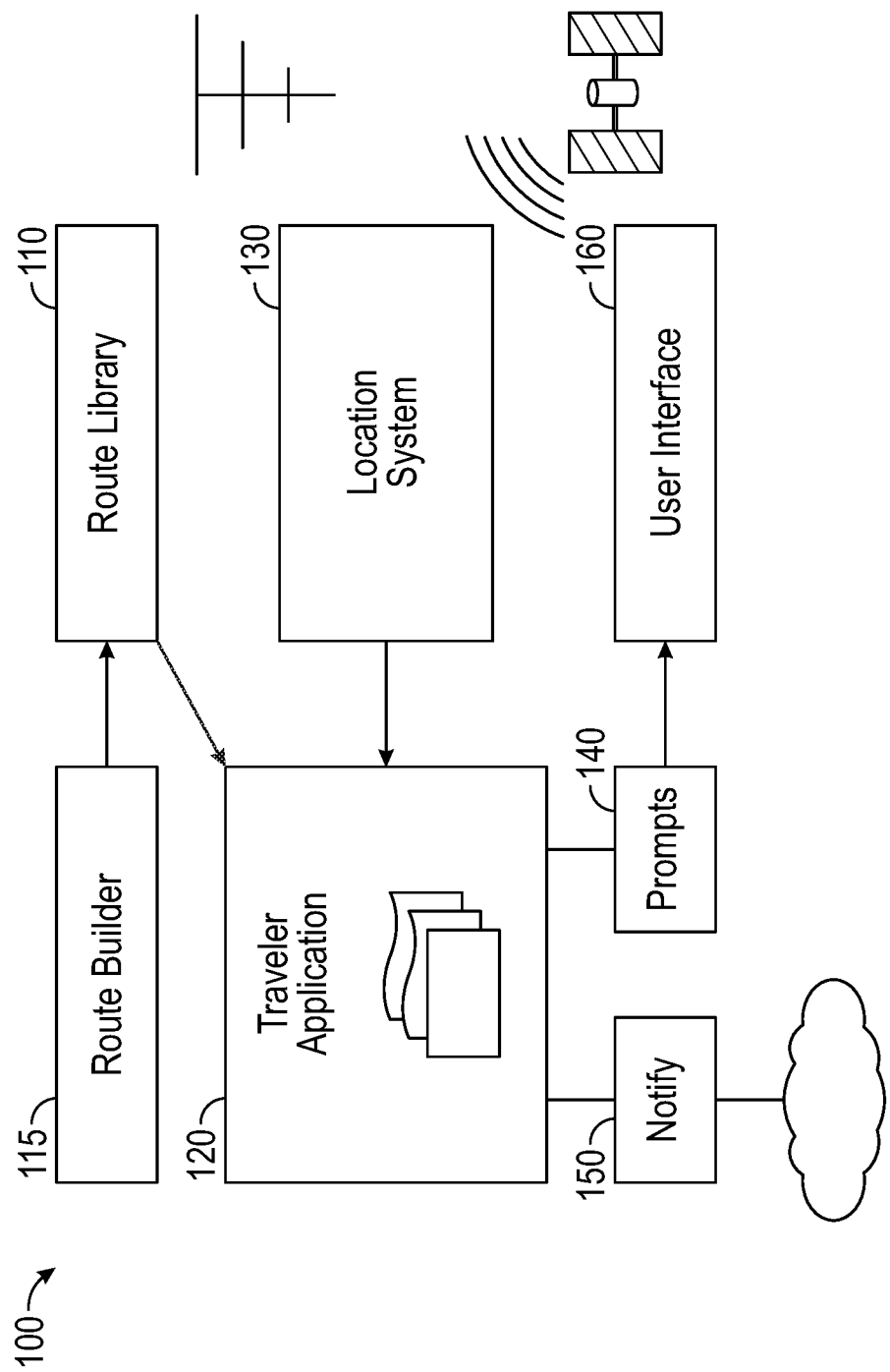
FIG. 1 shows high level system diagram of a mobile device travel system for individuals with cognitive disabilities, according to one embodiment of the present invention.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A travel system for individuals with cognitive disabilities provides location-based behavioral prompts configured to present instructional information via a user interface of a mobile device in a format suitable for an individual with a cognitive disability. Combining existing public transit information, geospatial mapping data, and location identification services, the present invention creates a series of location-based prompts tailored to individuals with a cognitive disability. Moreover, the location of the mobile device, and thereby the user, is monitored as compared to the active travel route. Upon a user's location deviating from the predetermined route for a certain period or beyond a specified route tolerance, the system prompts the user to return to the route while informing a caregiver of the status of the individual.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Included in the description are flowcharts depicting examples of the methodology which may be used in a travel system for individuals with cognitive disabilities. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

FIG. 1 provides a high-level block diagram of a travel system 100 for individuals with cognitive disabilities. In one embodiment the system is implemented on a mobile device, tablet, or the like. Independent travel for individuals with a cognitive disability is challenging. While the creation of location systems such as GPS and the mobility of cellular phones has transformed daily commuting and even extended traveling for many individuals, the programs, and interfaces operable on these devices are generally not compatible with individuals having a cognitive disability.

The present invention creates, using a route builder module 115, and stores, in a route library 110, a plurality of routes tailored for an individual with a cognitive disability. Each route captures data from public transit systems and other geospatial data relevant to the route and is thereafter further individually customized with visual and verbal prompts suitable and recognizable for an individual with a cognitive disability. In one embodiment, the present invention is comprised of several subcomponents or modules (software portions) that create an ecosystem as a traveler application 120 to support travel independence for individuals with a cognitive disability.

A route builder module 115 captures publicly available information from transit systems, geospatial data and the like and forms a basic route structure. The route builder then supplements each route visual and audio prompts suitable for an individual with cognitive disabilities. The routes, in one embodiment, are thereafter stored in a library 110 on a user's mobile device and access via a traveler application 120. While in one embodiment the application and route library are resident on the mobile device, in other embodiments, the routes, route library and the traveler application reside in a network environment with only a client application being resident on the mobile device.

When implemented, the traveler application gains information with respect to the location of the mobile device from a location system 130 (GPS, trilateration, multilateration, GSM, WiFi, inertial sensors, or the like) and accordingly presents timely and accurate location-based travel prompts 140 to the user via a user interface 160. The application further monitors the location of the device (individual) as compared to the selected/initiated travel route. Upon identifying a deviation from the route based on certain parameters, a notification 150 is issued to an individual or agency that can render assistance.

The prompts 140 associated with each route are individually customized and based on the needs of an individual. However, the basic structure of the routes can be shared among several users/caregivers. Using public information from transit systems and other geospatial data a route structure is formed which is thereafter supplemented with prompts that aid an individual challenged with a cognitive disability. Current mapping applications provide a list of instructions and graphics that can be overwhelming to an individual with a cognitive disability. And, importantly, the current applications and directions lack prompts to reassure individuals they are on the correct route or a prompt to prevent a likely incorrect action such as getting off a bus merely because others are getting off the bus. The route building process recognizes this limitation of the current state of the art when creating each route.

Figure 2:
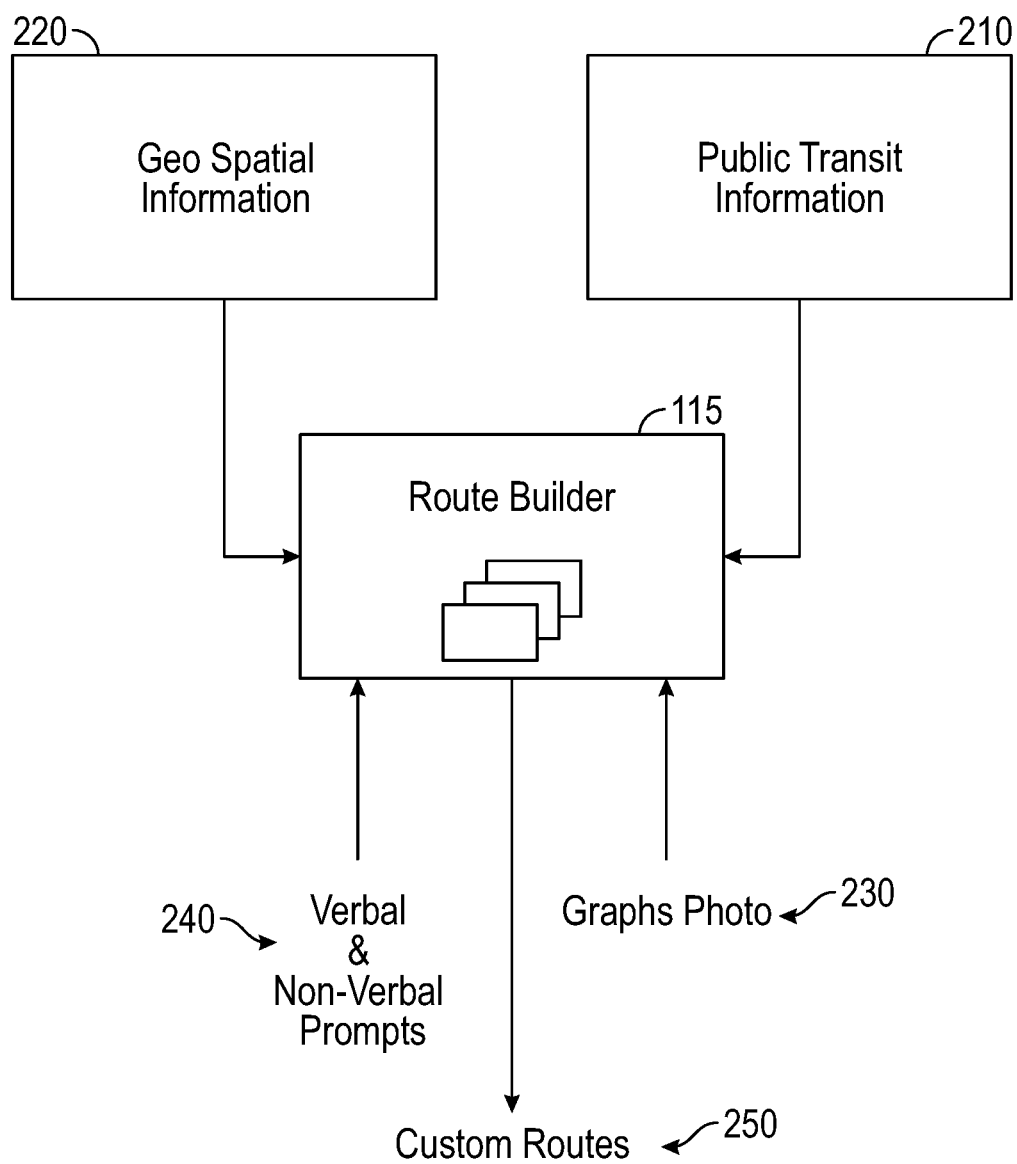
FIG. 2 is a high-level block diagram of the route builder component for a mobile device travel system for individuals with cognitive disabilities, according to one embodiment of the present invention.

As illustrated in FIG. 2, the present invention creates a route beginning with publicly available information 210 such as that provided by General Transit Feed Specification (GTFS) data and the like. For example, metropolitan areas freely provide public information regarding public transit routes (busses, trains, and the like). Many include information regarding the location of a bus stop, train depot or the like, as well as projected time of arrival of the next bus (or a bus you have identified) a projected departure time at any position along the route and even a projected time of arrival at a destination stop on the route. San Francisco's Bay Area Rapid Transit (BART) system, Muni (the local bus and train system) and CalTrans (for example) all provide data with respect to the routes and schedules and how these schedules can link together to travel from one part of the city to the other. Similarly, geospatial data 220 available from a wide variety of sources captured in maps identifies roads, paths, and the like not serviced by public transportation. Bike paths, and walking routes are also listed by such services. Individual routes, however, rarely begin or end at bus or train stops or even on a path. The route builder 115 recognizes this limitation. The route build begins by accessing and synthesizing data into a comprehensive database of route information using a Specialized Media for Assisting Route Travel (SMART) format. From that data a user or caregiver can establish a basis for a route for an individual with a cognitive disability. With the basis formed, the caregiver adds photographs 230 as well as verbal and no-verbal prompts 240 appropriate for the individual forming a customized route 250. For example, along the route while on the bus, the traveler may pass by a statute. A prompt may come up on the phone of a picture of the statute as the bus is approaching that point on the route and reassure the traveler that they are on the correct route, or that the traveler's stop is approaching.

Figure 3A:
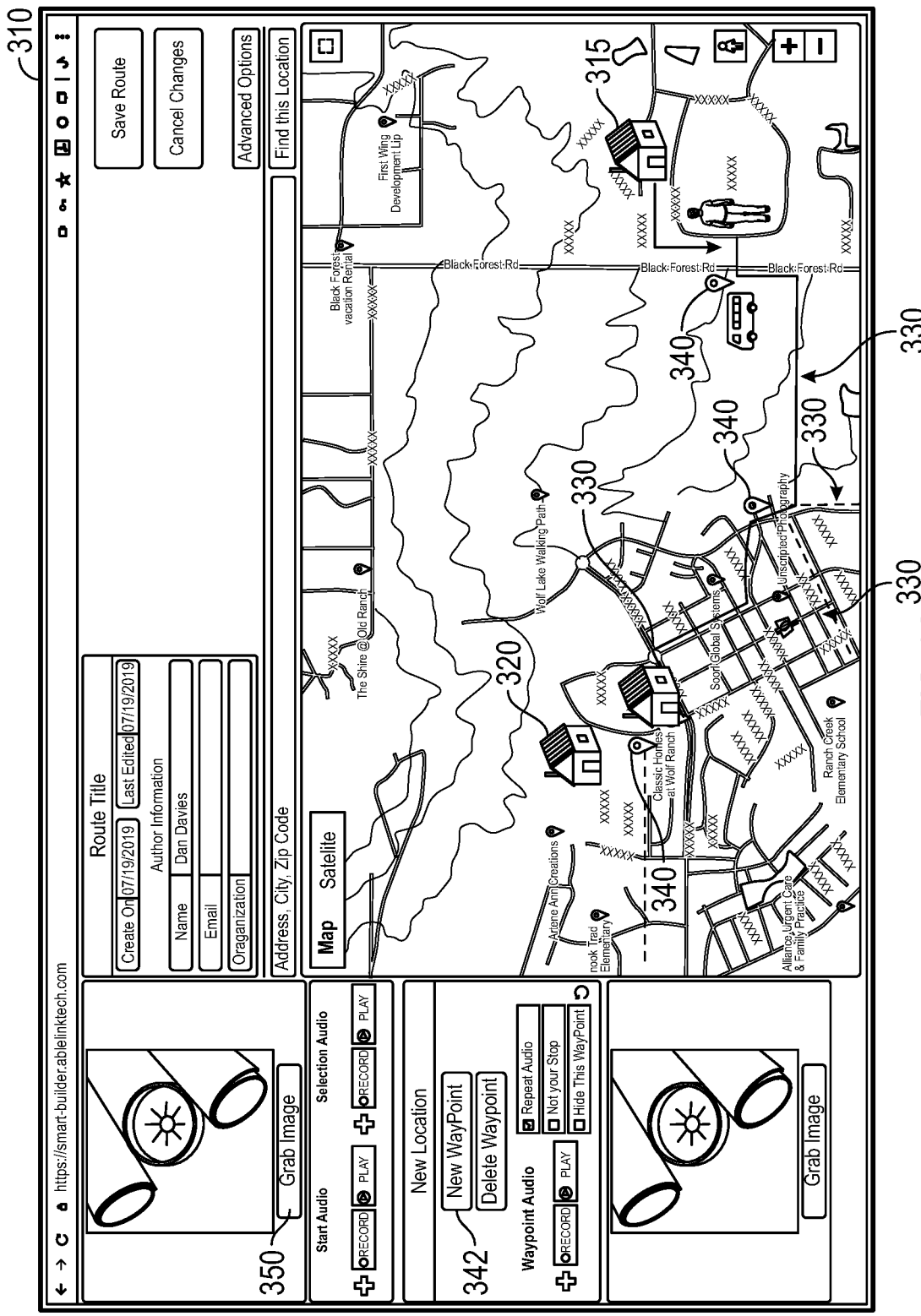
FIG. 3A is a graphical representation of a user interface used to create routes implemented by a mobile device travel system for individuals with cognitive disabilities, according to one embodiment of the present invention.

The present invention links different modalities of transportation in the creation of a comprehensive route for an individual. FIG. 3A is illustrates a user interface 310 for building a route basis for an individual with a cognitive disability. In this example the caregiver can identify the starting point 315 and the ending point 320 of the route and then view public transportation routes 330 that may be utilized. In this case several bus routes are available that may be combined to form a basic framework of a route. Waypoints 340 can be identified 342 as well. For example, a bus stop near the route's origin can a waypoint 340 as can be a bus station where the individual may have to transfer from one bus to another. The bus stop 340 at which point the individual must exist the bus can also be identified. In each case, location data is stored for each waypoint 340, and if images are available, that data is also added 350 to the route. One of reasonable skill in the relevant art will recognize that a route may include walking, riding a bike, or using public transportation. The map lays out the exact route from start to end and then enables the caregiver to add waypoints and prompts at appropriate locations.

As another example, consider an individual with a cognitive disability desiring to travel, independently, from their home in San Mateo, California to a friend's house in Noe Valley, San Francisco. One of reasonable skill in the relevant art will appreciate that many different routes can be designed using the route builder and stored in the route library including routes to work, school, a grocery store, and the like. In this example multiple options and combinations of public transit exist. One option provided by current travel apps provides the list of acts including walking to the train stop, boarding the train, getting off at the appropriate stop, walk to a local bus stop, transferring to certain bus, get off at a certain intersection, and walk to the destination.

Figure 3B:
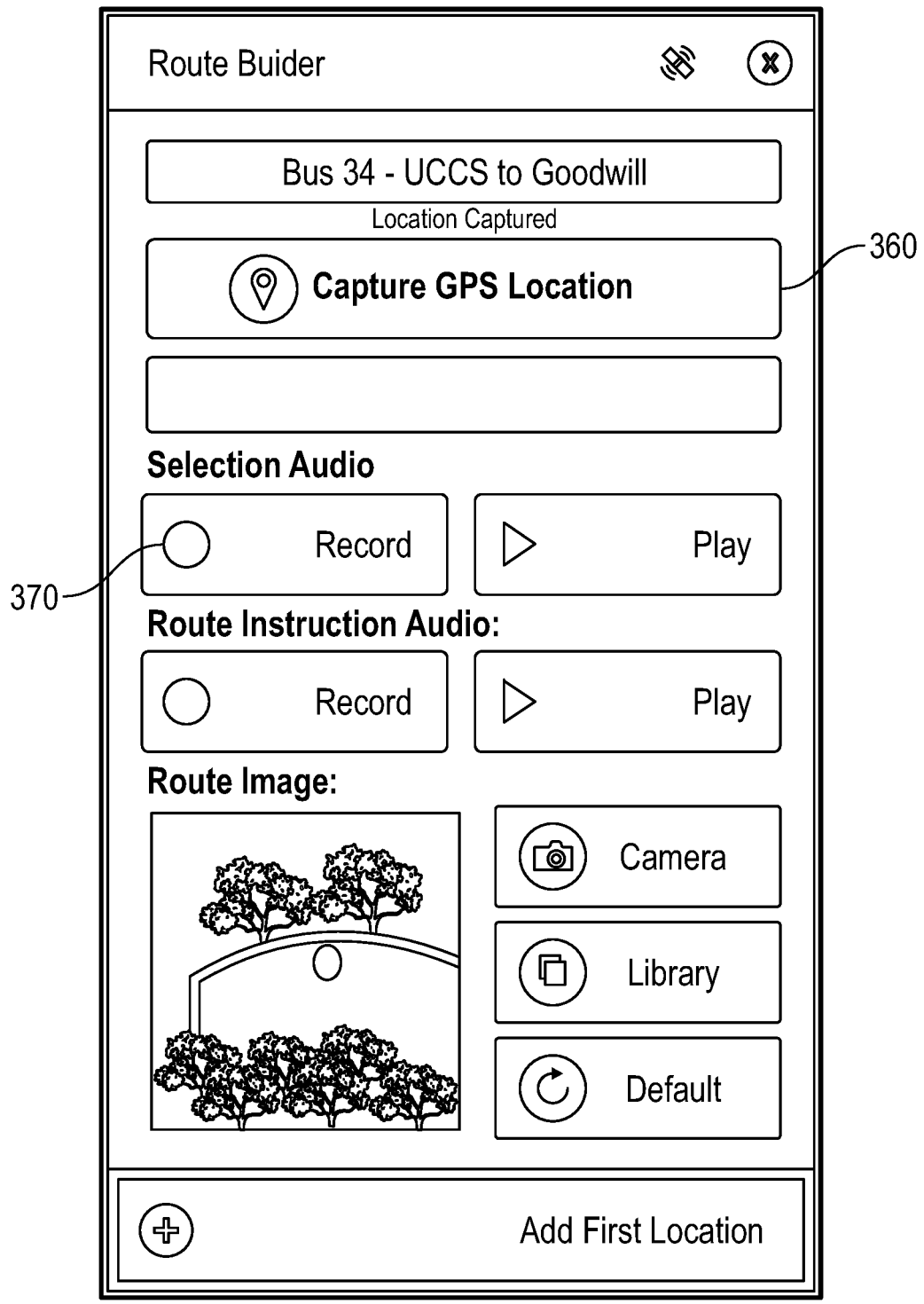
FIG. 3B depicts one representation of a mobile device user interface used to create routes implemented by a mobile device travel system for individuals with cognitive disabilities, according to one embodiment of the present invention.

In many instances these instructions are more than adequate for many individuals however they are sorely inadequate for an individual with a cognitive disability. Depending on the capability of the individual, several clear visual and audio prompts may be necessary to affect the travel. For example, the simple instruction of walking to the train station may include prompts of, "When you get to your mailbox look to the right and see the traffic light. Walk to the traffic light" along with a picture of the individual's mailbox and the traffic light down the street. As illustrated in FIG. 3B, one interface enables a caregiver to capture a of a waypoint or point of interest while a photograph can be taken. The photograph and its precise location stored as a waypoint. Then when the individual is on the route a picture of the mailbox will be shown as well as the traffic light. Similarly, at the train station prompts may include a picture of the stairs with an arrow at that very station and then tell the user, "Take these stairs to the upper platform". These prompts are woven into the route and triggered by the location of the mobile device.

In some instances, the voice prompt may not be to act but not to act. For example, when it is anticipated that many other people on a train may get off at a stop that, while on the current route, is not the desire stop, the application will provide prompts not to act. Rather than being silent and waiting to prompt the user to exit at the appropriate stop, one version of the present invention provides a "not your stop" prompt. The information allows the user to remain on the planned route with confidence they are on track.

The route builder feature shown in FIGS. 3A and 3B is a route builder utility that enables route creation by physically traveling the route, recording audio prompts, collecting pictures, setting GPS waypoints, and establishing prompts along the way. A caregiver can travel with an individual with a cognitive disability capturing images/photographs 360 of landmarks that are recognizable and of interest to the individual. Rather than randomly picking a picture of a building or a mailbox, a caregiver may note that the individual recognizes and is drawn to a particular sign or landmark. The caregiver can take a picture 360 of the landmark, make a verbal note 370, a stature, store, etc. and link the picture or note to the location 360 on the route. The route will then provide the user with a prompt they will quickly recognize.

The system of the present invention is configured, in one embodiment, to be linked (deployed) with a metropolitan transit system for a particular geographic area. In that case, authorized administrative users of the system can administer creation and modification of routes in a local route library and manage the content of the library. A transit agency can choose to partner with a third party that offers services within the region, to assist with route creation, deployment, and management of the route library. For example, bus routes and schedules may change. Again, these changes, while perhaps inconvenient, are easily manageable by most individuals. An individual with a cognitive disability however may grow to rely on a set schedule and any modifications or changes may be unsettling. The invention monitors routes in the local library and then notifies caregivers that changes have occurred, prompting a review of the prompts associated with the modified route.

Recall, each mobile device includes a personal route library specialized for each user. The system also includes a public route library which is available to any user and be used as the basis of an individualized route. These travel routes include specific turn by turn instructions for getting to a specific bus stop, riding on the bus, and notifying the driver when to stop the bus. Routes downloaded from the public route library can be edited (customized) to make the route more specific to the travel needs of a particular individual. However, these edited, personalized, routes cannot be uploaded from the mobile device back to the general route library because once a route is modified for a specific individual, that information is no longer appropriate for the public route library thereby protecting the privacy and security of the user.

While the present invention includes a route building module that is operable on a smartphone or mobile device, other versions of the invention include tools for creating routes on a desktop computer and the like using mapping software, such as commercial map applications, as well as more robust route creation and editing tools. The web-based route editing application (route builder) enables travel trainers or caregivers to create, edit and assign GPS coordinates to key locations on a designated route and record custom audio cues, such as "Do not get off here, you need to wait until the next bus stop" or "This is the doctor's office, you can get off the bus when it stops."

Digital pictures (which can be captured directly from the smartphone while editing a route or simply by selecting images available online when using the route builder module to create routes) can be displayed along with the audio prompts (or non-verbal prompts such as vibration) to help identify landmarks at a destination or along a route. For example, a voice prompt can show a picture of a church on the right side of the street with a prompt, triggered by the location of the device, that says, "John, you should see a church on the right side of the street. You are going to get off the bus in two blocks. Gather your things and get ready to pull the cable to stop the bus".

Once the route is built the caregiver can do a trial run and capture pictures along the route at the precise time a verbal prompt is given. Then the pictures can be uploaded and synchronized with the route location and prompts to provide the user with exactly the right picture and verbal prompt at the correct location.

As the user with special needs arrives at each location along the route, the app automatically presents travel instructions using audible and visual information and prompts (along with tactile alerts if supported by the hardware unit) associated with each specific geolocation. This allows caregivers to program cues for target destinations, as well as to provide the opportunity to anticipate points along the route where a mistake might be made and provide a pre-emptive cue (e.g., "Remember John, this is a different Starbuck's, so do not get off the bus here. Wait for your phone to tell when to get off the bus."). Digital pictures (which can be captured directly from a mobile device while editing a route or simply by selecting images available online when using route builder to create routes) are displayed along with the audio prompts to help identify landmarks at locations throughout the trip.

The route library and route builder modules work in concert with a traveler application resident, in one embodiment, on a mobile device. The traveler application is set of instructions executable by the processor on the mobile device that uses location identification technology such as GPS combined with specialized visual, audio, and tactile prompts to allow individuals with cognitive disabilities to use fixed route transportation, independently. With the traveler application, multiple travel itineraries, or routes, can be programmed into a single device to enhance travel choices and independent transportation. Once a route is created and stored on the mobile device, an individual with cognitive disabilities can then select the route and follow the multimedia step-by-step location-based prompts to arrive at his or her destination. Routes are generally depicted visually as well as with text. FIGS. 4A-4F provide an example of the operation and user interface of a mobile device travel system for individuals with cognitive disabilities.

One feature of the present invention to prevent confusion is to only show user routes that are currently accessible and to show them graphically. Accordingly, only locally available routes are displayed on the menu to eliminate the confusion. The application will not display route options that do not begin in the immediate vicinity of the user's location. For example, a user's library may include a route from home to work and another route from work to home. Both include the term work. To avoid confusion, when the mobile device identifies its location in the proximity of the user's home (or in the proximity of other starting locations near home) the menu only shows routes departing from a user's immediate vicinity. The measure of immediacy can be adjusted based on the individual and degree of accuracy of the location determination system. For example, the device can be set to show routes with start points within ¼ mile of the mobile device. In this case the route from work to home would not be listed as an option since the user is not within ¼ of the work location. Similar when the individual is at work, the route from home to work would not be listed but now route from work to home would be available. Similarly, the route would include a picture. For example, a picture of home may be used to identify the route to an individual's residence. While a picture of where the persons is employed may be used to identify the route to work.

The system is also able to direct the user to starting point or merge an existing route with a current location. To better understand the invention in operation, consider the example shown in FIGS. 4A-4F.

Figure 4A:
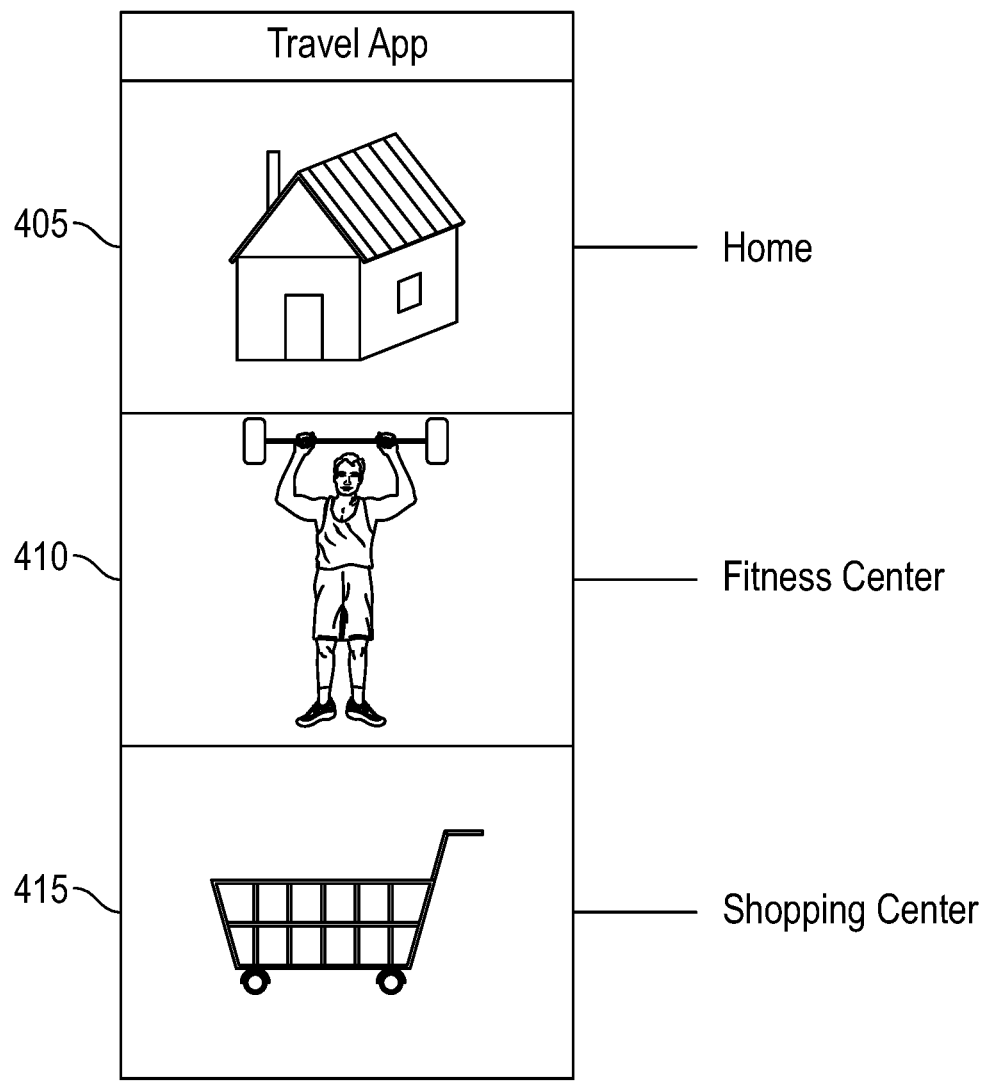
FIG. 4A-4F present a series of user interface example as would be seen by an individual using a mobile device travel system for individuals with cognitive disabilities, according to one embodiment of the present invention.
Figure 4B:
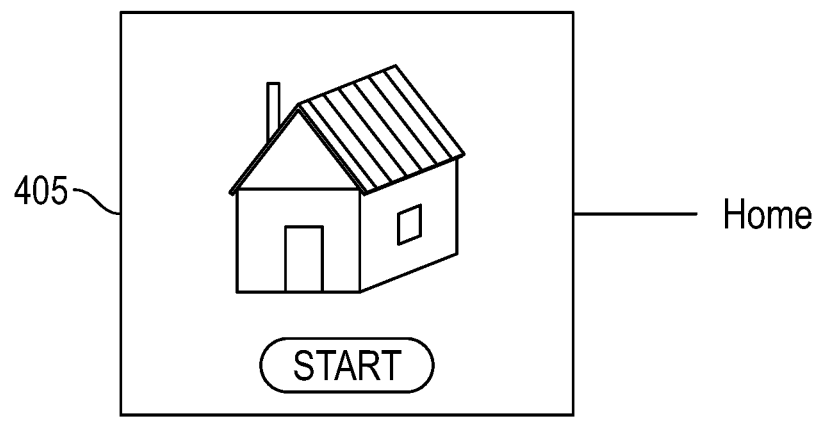
Figure 4C:
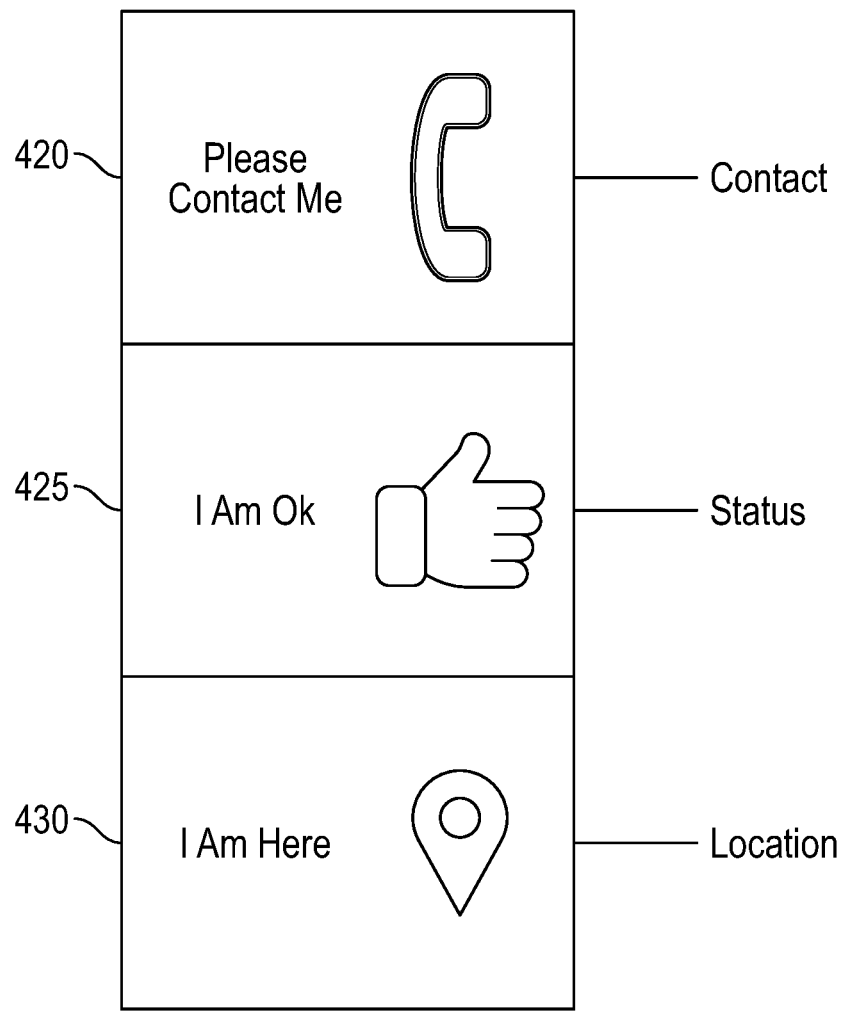

Assume for this example that the user is currently at a school location. One route that exists in the library is a route from home to school. Another known route of a user is from school to home. Other routes exist such as, home to fitness center, home to mom and dad, home to grocery store, school to fitness center, school to grocery store, grocery store to home, and the like. The traveler application on the user's mobile device identifies three routes that may be applicable for the user, based on the user's current location (at school). They include a route to home 405, a route to a fitness facility 410, and route to a shopping center 415 (grocery store). The route to home, as shown in FIG. 4A is depicted as an actual picture of the individual's home 405. Similarly, the other routes include actual pictures of the fitness facility 410 and a picture of the shopping center 415. The locations may also be described in text. As the user selects the route from the school to home the picture of the individual's house 405 is shown, as depicted in FIG. 4B, with a start button, reinforcing that this route will take the individual to his/her home.

When the user taps the Start button, the app moves to the first waypoint display, which is the starting location for the route. In this example assume the starting point of the route is a bus stop near the school. A picture of the actual bus stop is provided on the mobile phone and directions as how to get to the bus stop. As the individual arrives at the bus stop, an audio message may play at this point, such as "When the bus arrives, let people get off the bus before you get on, and make sure you have your bus pass ready." In areas in with the local transportation system provides real time tracking of public transportation, the app can also provide reassurance messages such as "The bus will arrive in 2 minutes". And as the bus is arriving, repeat the message "This is your bus. Let people get off the bus before you get on, and make sure you have your bus pass ready."

As the person boards the bus and the mobile device recognizes movement, other prompts, triggered by the location and motion of the mobile device, can be displayed. In between prompts, the present invention also includes a contact button 420 that allows the user to initiate several different ways for getting support from a caregiver, family member, or other remotely located individual. The device also allows the individual to send feedback such as "I'm OK" 425 or their location by hitting "I am here" 430 button.

Selecting the Please Contact Me 420 button sends an automated email/text to an electronic address (email/text) that can be entered ahead of time in the traveler application settings. This feature provides for users with quick and easy access to help or reassurance while traveling. Previous experience has shown that some users with cognitive disabilities may find it reassuring to let others know that they are traveling a route successfully. Finally, tapping the "I Am Here" 430 button sends an email message that includes a maps link of the user's current location. This feature also can provide reassurance to the user and a caregiver as to the user's whereabouts, or that the user has arrived safely at this or her destination. Further, this feature can be used to let a friend or caregiver know where the individual needs to be picked up if he or she is meeting someone in the community.

Figure 4E:
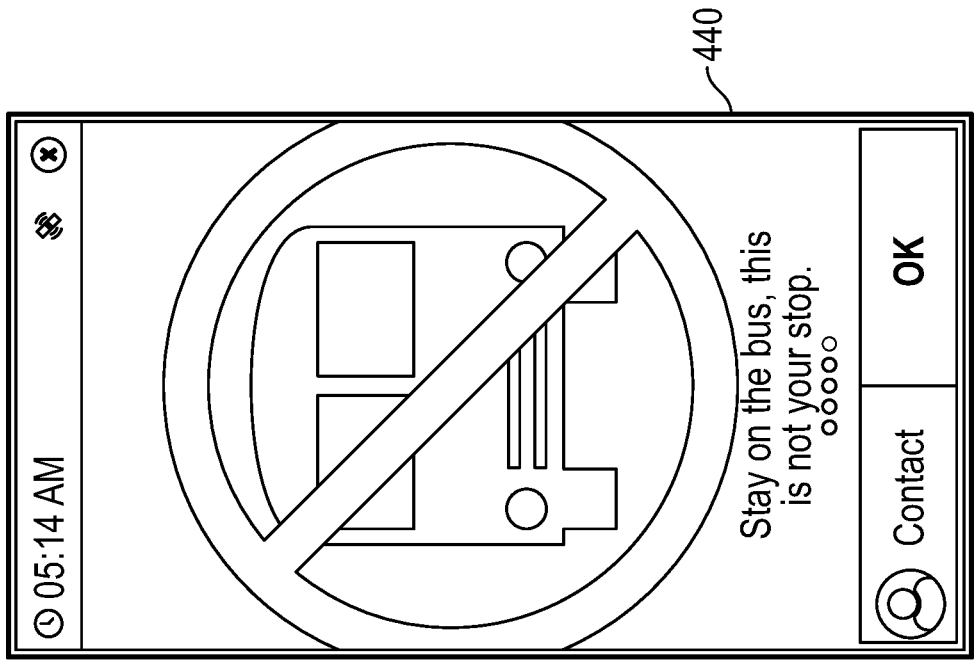
Figure 4D:
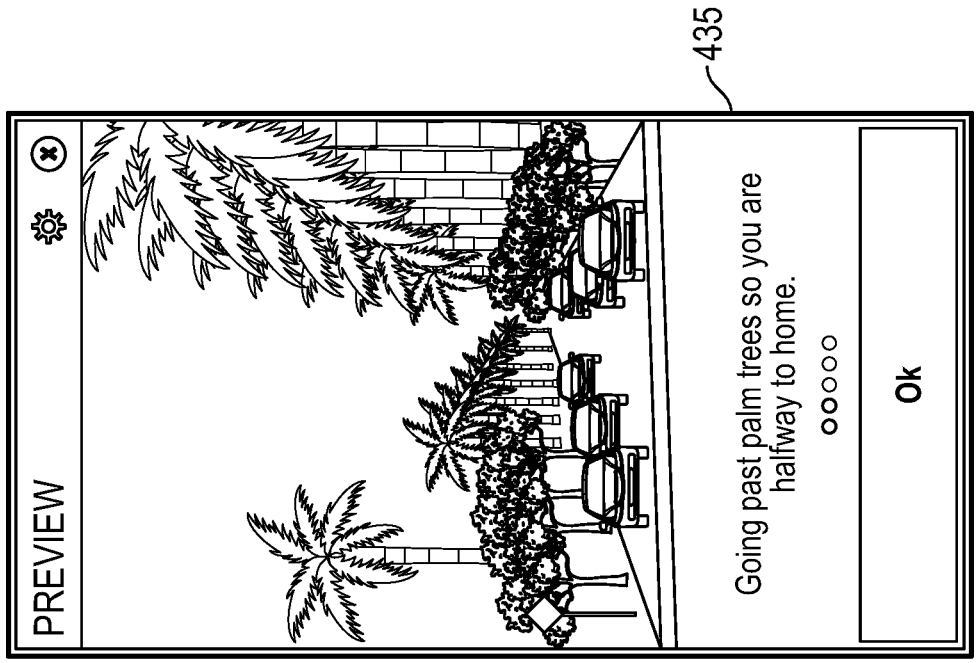
Figure 4F:
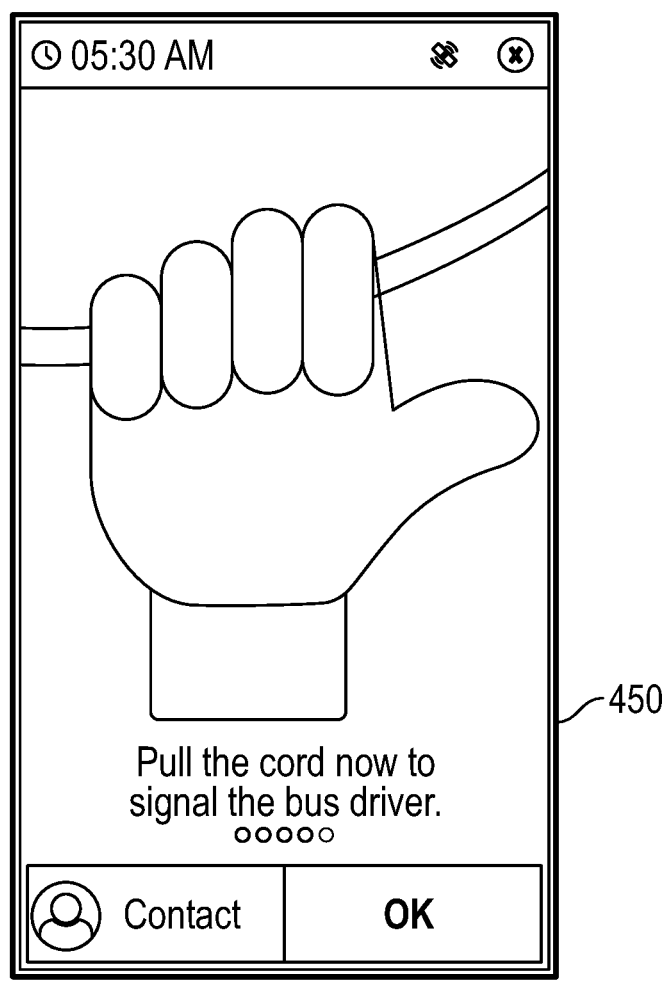

During route travel the traveler application detects when it is within a designated waypoint radius and automatically launches an image, audio message, and/or text description that define the waypoint location/prompt. These waypoints may describe several different notifications and locations. The illustration in FIG. 4D presents a reassurance message 435 that going past some palm trees indicates the user is halfway to home. As the bus slows, the traveler application it will recognize that the slowing bus is not associated with a waypoint at which the user is supposed to exit. Accordingly, the application will prompt the user to "Stay on the Bus" 440, as shown in FIG. 4E. As the user's location nears the waypoint on which they are to disembark the bus, a prompt is provided to "Pull the Cord" 450 and signal the driver that the user's stop is upcoming.

Figure 5:
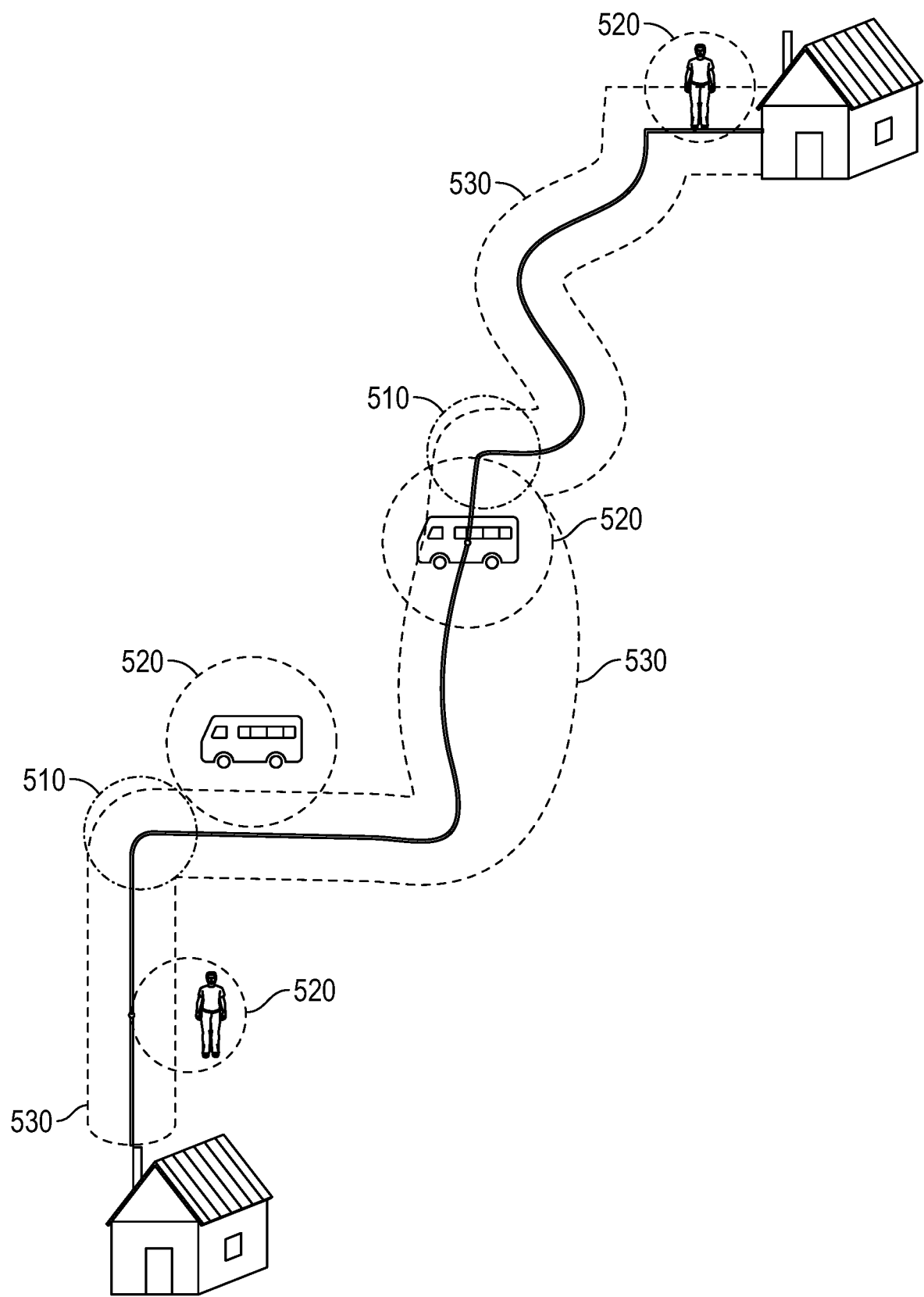
FIG. 5 presents one example of a route take by an individual with a cognitive disability using the mobile device travel system of the present invention illustrating varied accuracy of location-based services as compared to off route notification settings.

The range to trigger each of the travel prompts is individually configurable as is the settings that would identify a deviation from an initiated route. FIG. 5 illustrates an example route showing location-based prompt triggers and deviation settings. A setting for triggering a prompt indicates the radius of the circle 510 (in feet) that the mobile device must be in before it will launch location instructions (prompts). For example, if the in-range distance is set at 20 feet, the traveler application will launch audio and picture-based information when it is within a circle with a 20-foot radius (or 40-foot diameter) of where the waypoint was originally set. In FIG. 5, a route includes a user walking to a bus stop. As the user arrives within 20 feet 510, (shown by a dash-dot-dash line) the application will trigger a prompt telling the user they are at the bus stop and to wait for the bus. The smaller the distance, the more the user must be precisely within the GPS waypoint circle to activate the instructions for that waypoint. When the user gets on the bus and moves outside of the radius the prompt is removed.

The user can also tap an OK button to manually stop the instructions from playing after passing through a waypoint. Some users may prefer to manually tap the OK button to indicate they have passed a waypoint, while others may prefer for waypoints to automatically be dismissed.

The off-route feature of the present invention monitors the location of the mobile device as it travels along the selected route. As one of reasonable skill in the relevant art will appreciate, determining an exact location of a mobile device varies on several factors. GPS data, for example, is subject to, among others, atmospheric interference, calculation and rounding errors, orbital path data errors, and multi-path errors. At any one time the accuracy of the exact location of a mobile device may vary from a few meters to hundreds of meters. Similarly, trilateration and other time delay methodology to determine the location of a mobile device is also subject to errors. Some of these errors are well known and anticipated. For example, GPS data is prone to be less accurate in areas of tall buildings or deep valleys. GPS data is absent in tunnels.

The present invention considers the known accuracy of location information and the activity involved during each route segment in determining whether a mobile device (the individual) is off route. The present invention can notify a caregiver, family member or the like if an individual with a cognitive disability has deviated from a prescribed route of travel. Similarly, the traveler application can provide directions to the individual as how to return to the route or what actions to take until assistance can arrive. It is important to recognize that telling an individual with a cognitive disability they are off route can be troubling and indeed cause anxiety or an unfavorable response. It is therefore important to not only inform caregivers of an off-route status but to provide the individual traveler with a qualified response.

The present invention monitors accuracy of the location services and modifies the off-route criteria accordingly. Consider again the route shown in FIG. 5. In situations in which the accuracy of the location of the mobile device is high and in which the mode of travel is unitary such as walking as opposed to being in a group setting such as a bus, a minor deviation may result in a report to a caregiver and/or the traveler. Indeed, even with low accuracy the tolerance of deviation may be low in a mode in which the individual is alone. In FIG. 5 the individual begins a route by walking to a bus stop. The accuracy of the location service is accessed and shown in FIG. 5 with the dotted circle 520 surrounding the individual, and a low deviation tolerance is allocated, as shown by the dashes tied to the route, based on the unitary action of walking. If the location of the device strays outside of the accuracy location dashes 530, the user is off route.

When locational accuracy is known to diminish, the amount of acceptable deviation (in range and time) from the select route may, in other modalities, be increased to prevent any false positives. With reference again to FIG. 5, the individual route also uses a bus which experiences varied accuracy of locational information. However, the bus is a safer, collective environment in which higher locational tolerance is allocated. Rapid movement of the device (such as traveling at 30 MPH, albeit slightly off the road) is also an indication of location inaccuracy rather than route deviation. Accordingly, once the individual is confirmed to be on the bus, a higher degree of lack of location data may be tolerable 530 prior to indicating an off-route response. For example, the bus on a select route may proceed through a tunnel. While in the tunnel GPS data will be denied increasing the inaccuracy of locational information. Reacquisition of the signal within a certain period can be factored into the traveler/monitoring application, and notification may be delayed based on the known/expected loss of signal. Once the traveler exits the bus and continues the route by walking, off route tolerance 530 can be tightened to provide a quick notification when risk to the individual is high.

The system provides trip management tools to agencies, caregivers, and the like, the ability to view real-time trip updates and historical trip data for individual users participating in a travel support program. Live trip data allows agency staff to receive location data and user interaction updates as the trip progresses. This allows caregivers and support staff to be alerted to travelers off route, user-initiated messages, or requests for assistance, and even if the battery level of the device drops below a minimum value. Historical trip data includes all this same information for completed or aborted trips, as well as filters for selecting all trips by a particular individual, all trips taken for a particular route, as well as several other filters for trip end type and route type.

Another feature of the present invention is its ability to assist with dynamic travel or a community walkabout. When this option is checked (i.e., turned on), the application provides remote support whenever the user is not on a route, such as walking the rest of the way from a bus stop to a destination (e.g., work or the mall). When activated a remote caregiver can monitor the individual's travel progress using the supporting network site by logging in and selecting the active dynamic trip for the individual traveler. This feature is designed to support travel prior to the beginning of a trip or following the end of a trip, as well as to support general unplanned community travel by allowing a family member or caregiver to maintain awareness of a user's location while in the community.

Figure 6A:
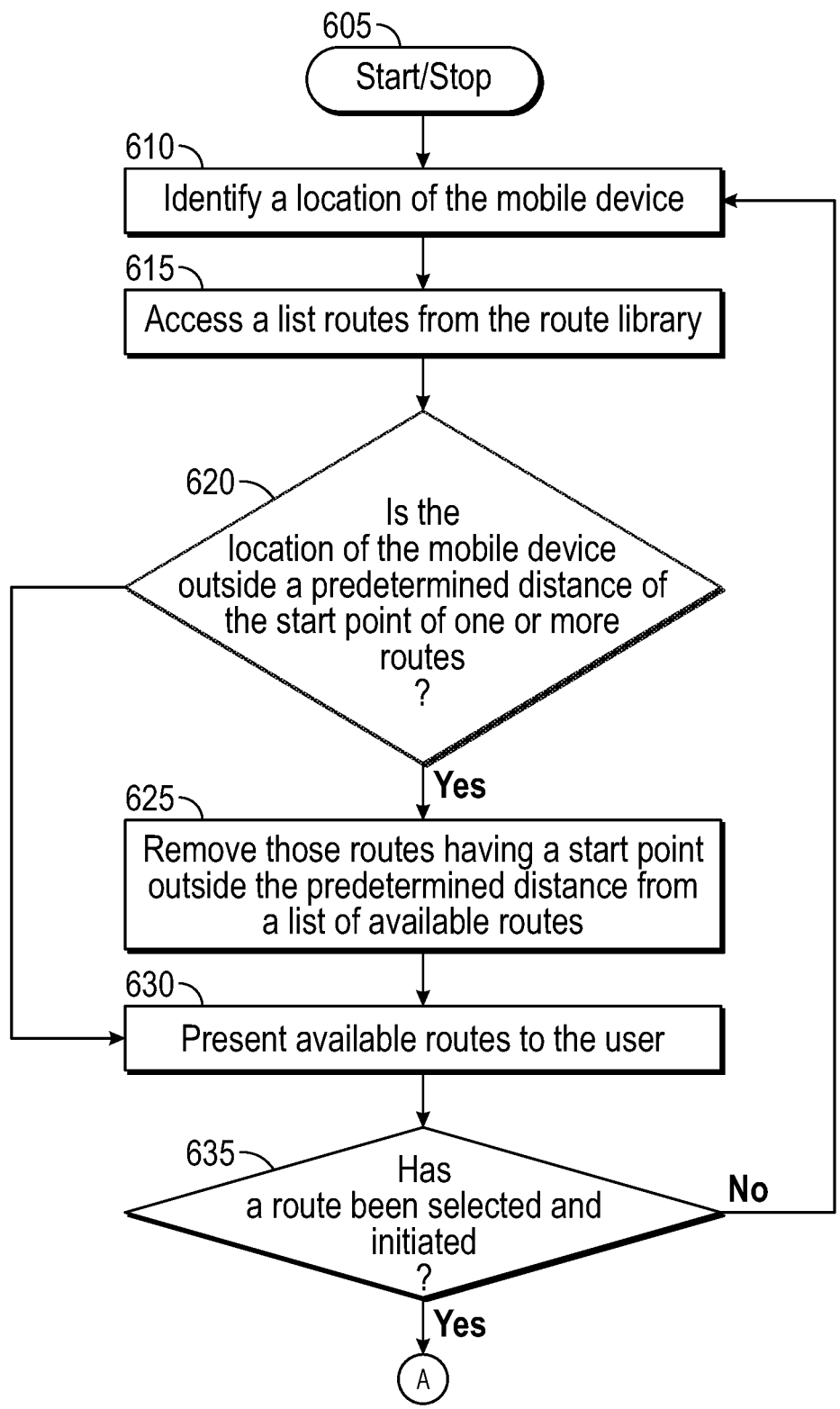
FIGS. 6A-6C are flowcharts of one methodology according to the present invention for using a mobile device travel system for individuals with cognitive disabilities, according to one embodiment of the present invention.
Figure 6B:
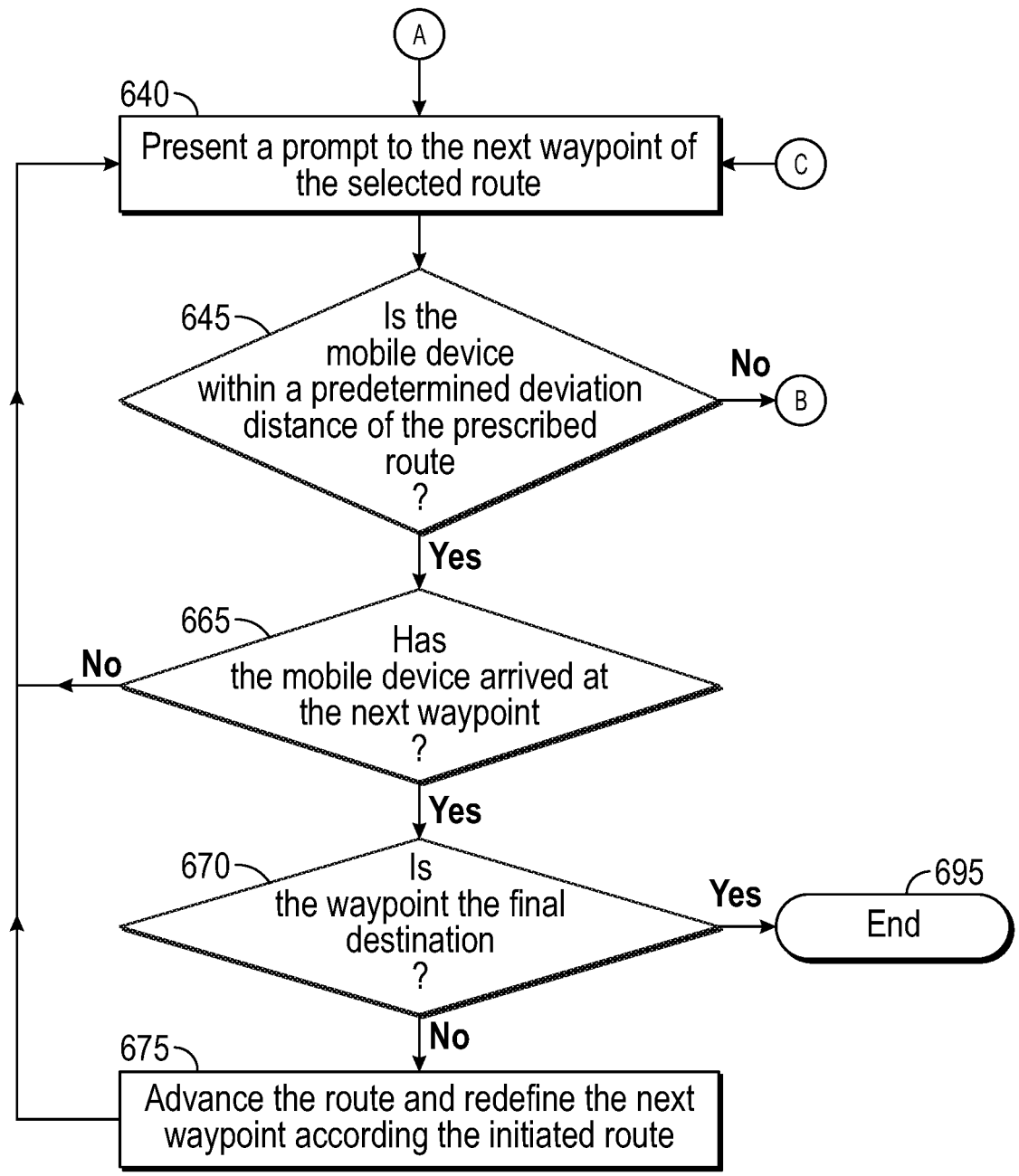
Figure 6C:
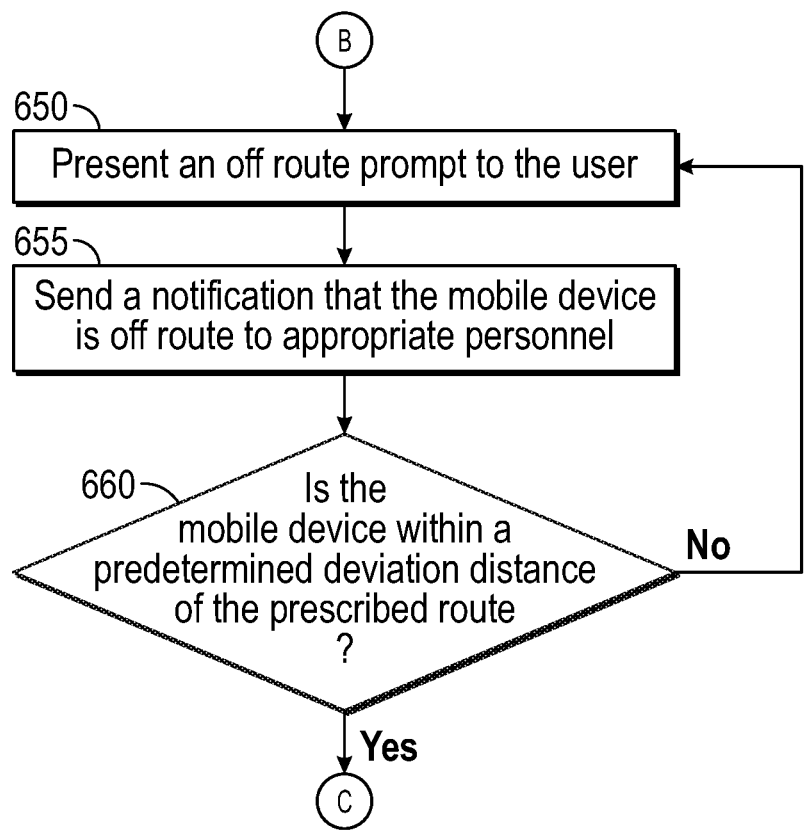

The present invention provides a mobile device travel system for individuals with cognitive disabilities. FIGS. 6A-6C provide a flowchart of one embodiment of methodology for providing a user with cognitive disabilities with travel prompts enabling independent mobility. The process begins 605 with accessing the location 610 of a mobile device such as a cellular telephone, tablet, or the like. Once the location of the device is ascertained, a list of all available routes 615 to the user is accessed from a route library. The location of the device is then compared to the start points of each route in the library. An inquiry 620 is made whether the location of the mobile device is outside a predetermined distance of the start point from each route. Those routes in which the start point is outside of the predetermined distance of the current location of the mobile device are removed 625 from the route list. The remaining routes, those in which the start point is within the predetermined distance from the location of the mobile device, are presented 630 to the user.

This process remains active until the user selects and initiates 635 a route. Once initiated the traveler application presents a prompt 640 to the user associated with the next waypoint. That waypoint can be a change in the modality of transportation (e.g., going from a bus to a train) or can be prompts to not take an action or even reassurance that the individual is on route, and everything is going well.

As the mobile device (user) proceeds on the route, the location of the device as compared to the route is monitored. The allowable deviation between the location of the device and the route varies. If the system recognizes that the mobile device's location is outside predetermined deviation distance 645 it presents an "Off Route" prompt 650 to the user in in some instances provides instruction as how to proceed. For example, is may tell the user to stay on the bus until assistance arrives or to seek assistance from the driver. At the same time a notification is sent 655 to appropriate personnel. The "off route" iteration continues until the location of the device is once again within 660 the predetermined deviation distance of a prescribed route.

When on route the system iteratively inquires 665 whether the device has arrived at the next waypoint. If not, the current prompt remains active. When the mobile device arrives at the next waypoint the system determines if that signals the final 670 destination has been reached. If so, the route is terminated 695. If the destination of the route has not been reached the route advances 675 and redefines the "next waypoint" according to the route. A new prompt is presented to the user and the route continues until ending upon arrival at the destination.

The present invention provides a travel system (and associated methodology) for individuals with cognitive disabilities. By utilizing existing information of community transportation offerings, the present invention builds customized travel routes enabling independent mobility for individuals with cognitive disabilities. Visual, aural, and sensory prompts are provided based on the location of, and through, a mobile device. Concurrently with providing direction and reassurance to the traveler, the system monitors the location and progress of the traveler along the route. Upon recognition that the mobile device (traveler) is no longer on the initiated route, a caregiver, or the like, is notified to render assistance.

It will be understood by those familiar with the art, that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

In a preferred embodiment, the present invention can be implemented in software. Software programming code (instructions) which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform tasks or implement abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be in both local and remote memory storage devices.

Figure 7:
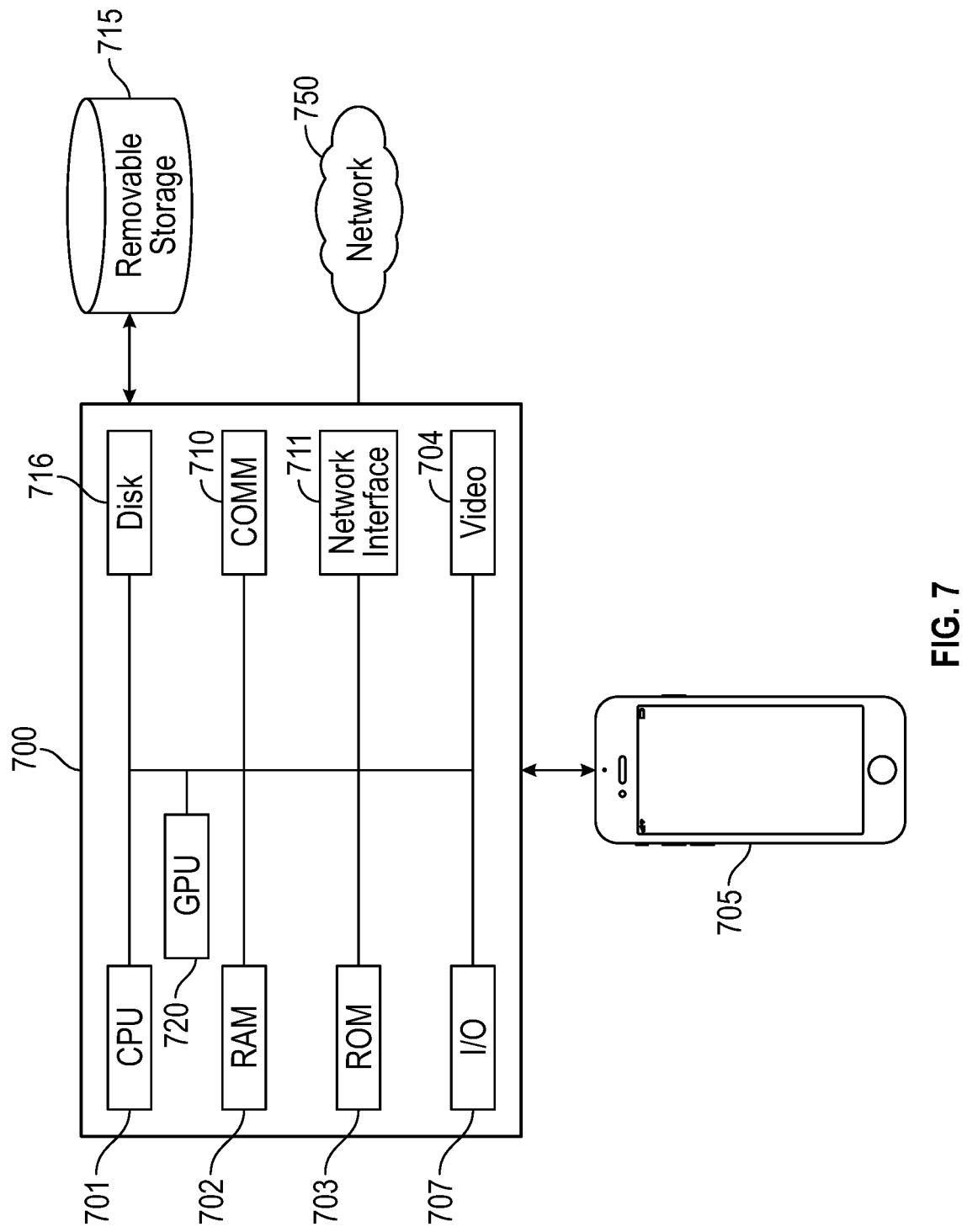
FIG. 7 is a high-level block diagram of components found in a computing device suitable for implementing one or more embodiments of the present invention.

One of reasonable skill will also recognize that portions of the present invention may be implemented on a conventional or general-purpose computing system, such as a personal communication device, a mobile device, a notebook computer, tablet, or the like. FIG. 7 is a very general block diagram of a computer system in which software-implemented processes of the present invention may be embodied. As shown, system 700 comprises a central processing unit(s) (CPU) or processor(s) 701 coupled to a random-access memory (RAM) 702, a graphics processor unit(s) (GPU) 720, a read-only memory (ROM) 703, a keyboard or user interface 706, a display or video adapter 704 connected to a display device 705, a removable (mass) storage device 715 (e.g., floppy disk, CD-ROM, CD-R, CD-RW, DVD, or the like), a fixed (mass) storage device 716 (e.g., hard disk), a communication (COMM) port(s) or interface(s) 710, and a network interface card (NIC) or controller 711 (e.g., Ethernet, WIFI). Although not shown separately, a real time system clock is included with the system 700, in a conventional manner.

CPU 701 comprises a suitable processor for implementing the present invention. The CPU 701 communicates with other components of the system via a bi-directional system bus 720 (including any necessary input/output (I/O) controller 707 circuitry and other "glue" logic). The bus, which includes address lines for addressing system memory, provides data transfer between and among the various components. Random-access memory 702 serves as the working memory for the CPU 701. The read-only memory (ROM) 703 contains the basic input/output system code (BIOS)—a set of low-level routines in the ROM that application programs and the operating systems can use to interact with the hardware, including reading characters from the keyboard, outputting characters to printers, and so forth.

Mass storage devices 715, 716 provide persistent storage on fixed and removable media, such as magnetic, optical, or magnetic-optical storage systems, flash memory, or any other available mass storage technology. The mass storage may be shared on a network 850, or it may be a dedicated mass storage. As shown in FIG. 7, fixed storage 716 stores a body of program and data for directing operation of the computer system, including an operating system, user application programs, driver, and other support files, as well as other data files of all sorts. Typically, the fixed storage 716 serves as the main hard disk for the system.

In basic operation, program logic (including that which implements methodology of the present invention described below) is loaded from the removable storage 715 or fixed storage 716 into the main (RAM) memory 702, for execution by the CPU 701. During operation of the program logic, the system 700 accepts user input from a keyboard and pointing device, as well as speech-based input from a voice recognition system (not shown). The user interface permits selection of application programs, entry of keyboard-based input or data, and selection and manipulation of individual data objects displayed on the screen or display device 705. Likewise, the pointing device, such as a mouse, track ball, pen device, touch screen, or the like, permits selection and manipulation of objects on the display device. In this manner, these input devices support manual user input for any process running on the system.

The computer system 700 displays text and/or graphic images and other data on the display device 705. The video adapter 704, which is interposed between the display 705 and the system's bus, drives the display device 705. The video adapter 704, which includes video memory accessible to the CPU 701, provides circuitry that converts pixel data stored in the video memory to a raster signal suitable for use by a cathode ray tube (CRT) raster or liquid crystal display (LCD) monitor. A hard copy of the displayed information, or other information within the system 700, may be obtained from a printer or other output device.

The system itself communicates with other devices (e.g., other computers) via the network interface card (NIC) 711 connected to a network (e.g., Ethernet network, Bluetooth wireless network, or the like). The system 700 may also communicate with local occasionally connected devices (e.g., serial cable-linked devices) via the communication (COMM) interface 710, which may include a RS-232 serial port, a Universal Serial Bus (USB) interface, or the like. Devices that will be commonly connected locally to the interface 710 include laptop computers, handheld organizers, digital cameras, and the like.

While there have been described above the principles of the present invention in conjunction with a mobile device travel system for individuals with cognitive disabilities, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A system for travel assistance, comprising:
   a mobile computing device comprising: a graphical user interface; an audio output device; a location identifier configured to identify a mobile device location; memory configured to store instructions that are executable on a computer; and a computer processor configured to access memory and execute the instructions to:
   access a library of route files, each route file including a travel route, wherein the travel route includes a start point, an end point, and a waypoint, the waypoint representing a location on the travel route, and wherein the waypoint includes a prompt configured to present travel information to a user with a cognitive disability;
   prompt the user to select a travel route from a subset of travel routes having a proximity between the start point and the mobile device location;
   receive a selected travel route from the user;
   prompt the user to follow the selected travel route, wherein the selected travel route includes a route waypoint;
   track the mobile device location relative to the selected travel route and the route waypoint;
   display, when the mobile device location is within a radius of the route waypoint, a waypoint prompt;
   notify, when the mobile device location deviates from the selected travel route, one or more of a caregiver, or the user.

2. The system for travel assistance according to claim 1, each travel route further comprising one or more of a custom waypoint and a custom prompt, wherein the custom waypoint and the custom prompt are selected to accommodate one or more of the cognitive disability of the user, or an individual need of the user.

3. The system for travel assistance according to claim 1, wherein the waypoint is one or more of the start point, the end point, a landmark, a public transit stop, a location requiring a change of direction, or a location requiring a change of travel means.

4. The system for travel assistance according to claim 1, wherein the prompt is one or more of a photograph, a graphic, a text instruction, or a recorded audio instruction.

5. The system for travel assistance according to claim 1, further comprising:
- detecting a speed or an acceleration of the mobile computing device;
- display, based on the mobile device location and one or more of the speed or the acceleration, a motion prompt.

6. The system for travel assistance according to claim 1, wherein the notify step further includes notifying the caregiver when the mobile device location is outside of a distance from the selected travel route for an amount of time.

7. The system for travel assistance according to claim 1, wherein the notify step further includes providing return instructions to the user when the mobile device location is outside of a distance from the selected travel route for an amount of time.

8. The system for travel assistance according to claim 1, further comprising:
- receive from the user a support request;
- contact the caregiver in response to the support request;
- prompt the user to select a feedback message; and
- relay a selected feedback message to the caregiver.

9. A computer program product embodied on a non-transitory computer-readable storage medium and comprising instructions that, when executed by a computing device, is configured to cause the computing device to:
- access a library of route files, each route file including a travel route, wherein the travel route includes a start point, an end point, and a waypoint, the waypoint representing a location on the travel route, and wherein the waypoint includes a prompt configured to present travel information to a user with a cognitive disability;
- prompt the user to select a travel route from a subset of travel routes having a proximity between the start point and a computing device location;
- receive a selected travel route from the user;
- prompt the user to follow the selected travel route, wherein the selected travel route includes a route waypoint;
- track the computing device location relative to the selected travel route and the route waypoint;
- display, when the computing device location is within a radius of the route waypoint, a waypoint prompt;
- notify, when the computing device location deviates from the selected travel route, one or more of a caregiver or the user.

10. The computer product of claim 9, each travel route further comprising: one or more of a custom waypoint and a custom prompt, wherein the custom waypoint and the custom prompt are selected to accommodate one or more of the cognitive disability of the user, or an individual need of the user.

11. The computer product of claim 9 further comprising instructions configured to cause the computing device to notify the caregiver when the computing device location is outside of a distance from the selected travel route for an amount of time.

12. The computer product of claim 11, wherein the difference between the computing device location and the selected travel route is based on a degree of confidence of the computing device location.

13. The computer product of claim 9, further comprising instructions configured to cause the computing device to provide return instructions to the user when the computing device location is outside of a distance from the selected travel route for an amount of time.

14. A computer implemented method, comprising:
- creating a public travel route, comprising: accessing public data related to a public transit system; accessing geospatial data; and constructing the public travel route using the public data and the geospatial data;
- assembling a public route library, comprising creating a plurality of public travel routes;
- creating a private travel route, comprising: selecting a start point and an end point; selecting one or more public travel route(s) from the public route library; constructing one or more walking segment(s); assembling a route from the start point to the end point using the selected public travel routes and the walking segments; adding a waypoint on the route; associating a prompt to the waypoint; and
- assembling a private route library, comprising creating a plurality of private travel routes.

15. The computer implemented method of claim 14, wherein the public data includes one or more of General Transit Feed Specification data, public transit route data, bus stop locations, train stop locations, public transit schedules, projected times of arrival, and projected times of departure.

16. The computer implemented method of claim 14, wherein the geospatial data includes one or more of road information, walking path information, bike path information, or map data.

17. The computer implemented method of claim 14, wherein the waypoint is one of a bus stop, a train stop, a bus transfer station, a train transfer station, a GPS location, or an intersection.

18. The computer implemented method of claim 14, wherein the creating a private travel route step further comprises: setting a custom waypoint based on physical travel of the private travel route; receiving a custom prompt for the custom waypoint; and associating the custom prompt with the custom waypoint.

19. The computer implemented method of claim 18, wherein the custom prompt is one of a photograph, a graphic, a text instruction, or a recorded audio instruction.

20. The computer implemented method of claim 14, wherein the creating a private travel route step further comprises: monitoring the plurality of public travel routes for changes; and notifying a caregiver when a change applies to one of the plurality of private travel routes.

\* \* \* \* \*